Sept. 16, 1969     M. J. NELSON ET AL     3,466,781

ICE FISHING ACCESSORY

Filed July 8, 1966

INVENTORS
MERRITT J. NELSON
FRANK KORANY
BY
*Price & Heneveld*
ATTORNEYS

United States Patent Office 3,466,781
Patented Sept. 16, 1969

3,466,781
ICE FISHING ACCESSORY
Merritt J. Nelson, 2142 Griggs SE., Grand Rapids, Mich. 49506, and Frank Korany, 3976 Cornell, Dearborn, Mich. 48125
Filed July 8, 1966, Ser. No. 578,909
Int. Cl. A01k 97/00
U.S. Cl. 43—4      7 Claims

ABSTRACT OF THE DISCLOSURE

An apparatus for protectively covering an ice fishing hole while permitting fishing through the same, including an annular shroud and a dome detachably carried atop the shroud to substantially close its central opening, such dome having a relatively small opening therein for the fishing line, and a slot communicating with such opening and extending outwardly to the edge of the dome, for facilitating entry of the line through the opening, and with ventilation openings defined between the dome and the shroud for perventing fogging of the dome.

---

Figure 1:
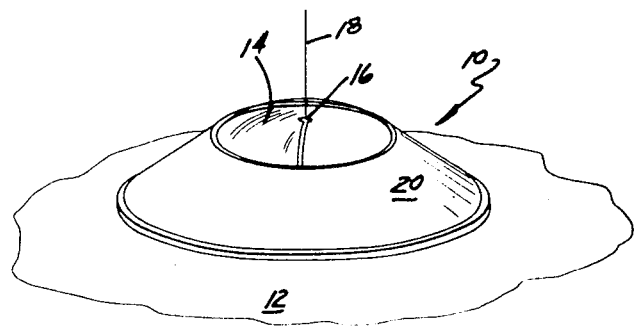

This invention relates to fishing equipment, and more particularly to an accessory device for use in winter sport fishing done through a hole in the ice on a lake, stream, or the like.

Ice fishing has long been practiced by avid anglers who refuse to allow a thick layer of ice covering the surface of desired fishing waters to prevent them from engaging in their favorite sport. Instead, a hole is chopped in the ice and a fishing line is lowered into the water through the hole. This method has long been used with a variety of different fishing equipment, including poles and ingenious devices for holding the poles. Due to the extreme cold weather in which such fishing is usually carried on, many problems occur during the course of a day's fiishing through an open hole chopped in the ice. For example, a brisk wind will almost always blow across the relatively unobstructed surface of the ice and will frequently blow directly across the open hole in the ice to lower the temperatures thereabout and cause the hole to freeze over once again before one is through fishing, and even while one's fishing line is suspended in the water through the hole, thereby freezing the fishing line fast. Further, the wind will often blow snow across the open expanses of ice and as the snow is blown across the hole it will drop into it, along with chips of ice and the like lying thereabout. This of course obscures the hole so that one cannot see into the water beneath it, and may soon plug the hole completely and cause it to be quickly frozen over once again.

The present invention has as one of its major objects the provision of an accessory means for ice fishing which covers the hole in the ice after it has been cut, to shelter the hole from the cold wind and help prevent it from being frozen over, and also to prevent the entry thereinto of snow, ice and the like, while simultaneously permiting one to fish through the covered hole in the desired manner.

A further important object of the present invention is to provide an accessory device of the nature indicated which includes a clear dome or lid portion through which one may easily see through the hole and into the water therebeneath, to better carry out the fishing. The device also includes the provision whereby the said clear dome is prevented from being fogged over from within, due to a temperature differential which occurs when the sun shines directly onto the dome.

A still further important object of the invention is to provide a device of the foregoing nature which is arranged to permit easy access of the fishing line into and out of the covered hole, without the necessity of disturbing the cover, and without the requirement of any tedious threading of the cover over the fishing line.

A still further important object of the present invention is to provide a fishing accessory device of the character described which is constructed so as to provide extremely easy removal of the device from over the fishing hole, even though it may have become frozen to the ice in the course of an extended day of fishing.

The foregoing major objects of the invention and the advantages provided thereby, together with additional objects and advantages equally a part thereof, will become increasingly apparent following a consideration of the ensuing specification and its appended claims, particularly when these are taken in conjunction with the accompanying illustrative drawings setting forth a preferred embodiment of the device.

Figure 3:
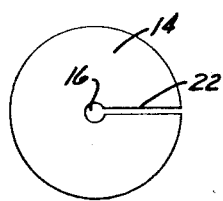
Figure 2:
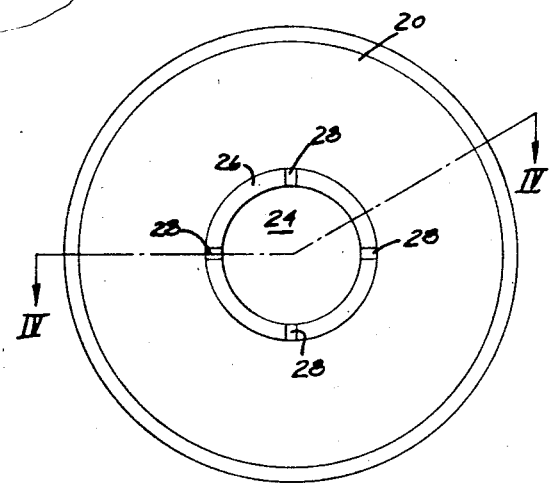

In the drawings:
FIG. 1 is a frontal perspective view of the device showing the manner in which it is used, including a fishing line passing therethrough;
FIG. 2 is an enlarged overhead perspective of one portion of the device;
FIG. 3 is an enlarged overhead perspective of a second portion of the device; and
FIG. 4 is an enlarged cross sectional side elevation as taken through the plane IV—IV of FIG. 2, showing the devices of both FIGS. 2 and 3 in an operative position over a fishing hole.

Referring now in more detail to the drawings, the apparatus of the invention is seen in FIG. 1 to comprise a canopy means 10 which covers or hoods a hole cut in the ice 12 by fitting thereover. The canopy means 10 has a dome portion 14 at its top, and the dome portion has an opening 16 therein, through which a fishing line 18 may pass, so that one may fish through the canopy and the hole in the ice 12 sheltered therebelow.

Figure 4:
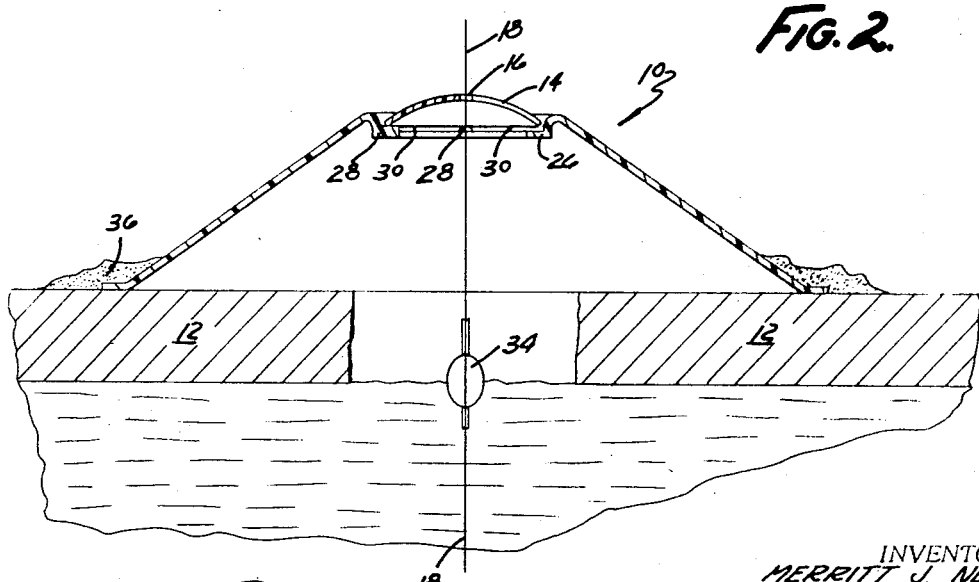

More specifically, the canopy means 10 includes two separable structures, the dome portion 14 already indicated, and a shroud 20 upon which the dome 14 is concentrically positioned (FIGS. 2, 3 and 4). The dome 14 is a saucer-shaped element preferably formed from a clear plastic or the like, through which one can see into the fishing hole. Dome 14 has a central opening 16, and a slot 22 which extends from a peripheral edge of the dome radially thereof into the opening 16 at the center. Slot 22 comprises an access means which provides a passage for the fishing line, to facilitate entry thereof into the hole 16 in the dome. In this manner, the dome may simply be slid over the fishing line 18 by passing the line through the slot 22 and into the hole 16. Thus, it will be apparent that the slot 22 should have a separation opening which is at least slightly wider than the fishing line.

The shroud 20 of the canopy means comprises a dish-shaped member which is preferably made from a flexible plastic substance such as polyethylene. The shroud is open at each end, having a large bottom opening for fitting over the hole in the ice 12 and a smaller axial or central opening 24 in its top. The top portion of the shroud is arranged to have a circular flange 26 extending into the opening 24. This flange serves as a mounting structure for restingly supporting the dome 14 about its periphery atop the shroud. The flanged mounting structure 26 preferably has a series of equally-spaced raised rib means 28 thereupon which actually contact the peripheral lower edge of the dome 14 to support the same. This arrangement provides a series of ventilation openings 30 (FIG. 4) comprising a space between the peripheral edge of the dome 14 and the circular flange 26 of the shroud 20, between each of the raised rib means 28 supporting the dome.

The ventilation openings 30 are a very desirable feature, since when the canopy means is positioned over a fishing hole it forms a sheltered compartment which may become warmed by direct sunlight upon the upper surfaces of the canopy, particularly upon the lucid dome portion 14 thereof. Thus, the condition may arise where the outside air and the canopy means itself are at a significantly lower temperature than the air inside the canopy. This warmed, moisture-laden air may then condense against the cold canopy means and tend to fog the clear dome portion 14 thereof, thereby obscuring one's view into the canopy means and the fishing hole. The ventilation openings 30 allow circulation of air from the outside to the inside of the canopy means and vice versa, thereby providing an equalization of temperatures and preventing any such fogging.

The operation of the novel canopy means is likely to already be apparent. After the fishing hole has been cut, the shroud 20 is simply seated over the top of the hole by placing it upon the ice 12 and, preferably, by placing a small amount of snow or ice 36 chopped in making the hole around the edges of the canopy to securely hold it in place. The dome portion 14 is then slid over the fishing line 18 by passing the line through the slot 22 in the dome and into the central opening 16 therein. The line is then dropped through the central shroud opening 24 and into the water, and the dome is released so that it drops into place upon the ribs 28 of the circular flange 26. This tends to center the line within the fishing hole and keep it away from the rough edges thereof, where it might otherwise snag or become frozen fast.

With the shroud and dome forming the canopy means in place, one fishes through the hole in the ice therebeneath, meanwhile observing the interior of the canopy and the top of the water appearing in the fishing hole, where a float or bobber 34 typically marks the point where the fishing line enters the water. The clear dome 14 will never be obscured by condensation or fogging, and consequently the bobber 34 will always be clearly visible.

When a fish takes the bait and is hooked, the bobber 34 naturally drops, and the observing fisherman begins to pull his line upward out of the water. As the line is pulled upward through the opening 16 in the dome 14, the bobber 34 soon encounters the surface of the dome and the dome is lifted off the top of the shroud 20. Bobber, line, and fish are all easily drawn upward through the central shroud opening 24. The dome 14 may easily be pulled off the line as it is raised, by means of the slot 22 in the dome. However, normally the dome will merely rest atop the bobber and the dome need not even be removed from the line. After the fish is unhooked and the hook is newly baited, the line is easily dropped through the opening in the shroud and into the water once again, with the dome 14 typically settling into place atop the shroud without any assistance being required. As the day proceeds, the hole in the ice remains clear and unobstructed, and no further chopping, cutting, or clearing out of the hole is required throughout the period one wishes to fish.

When the day's fishing is over, the external snow and ice 36 around the bottom edges of the shroud 20 will frequently have become at least partially frozen, thereby freezing the shroud to the ice atop the fishing hole. However, due to the resilient nature of the plastic shroud, it is easily removed even though it is firmly frozen to the ice, by either inserting one's hand through the central opening 24 in the shroud and pulling upwardly, or even by kicking the shroud with one's foot, thereby flexing it and easily breaking the ice away to release it. Thus, while other materials might be used to form the shroud, the preferred flexible plastic in itself adds a desirable feature enabling the shroud to withstand practically any amount of rough treatment.

It is quite conceivable that upon becoming familiar with the foregoing specification, others may wish to change specific features of the novel device which has been disclosed, or to incorporate certain modified details of construction which nonetheless fully utilize the concepts involved in the invention and provide may of the same advantages and benefits.

What is claimed is:

1. Apparatus for protectively covering an ice fishing hole while permitting fishing therethrough, comprising: a canopy means for hooding such a hole by fitting thereover; said canopy means including a shroud and a dome portion detachably carried by said shroud and closing the top of the canopy means; said dome portion having an opening therein through which a fishing line may pass.

2. The apparatus defined in claim 1, wherein said dome portion defines a slot extending inwardly from an edge of said dome portion to an edge of the said opening formed therein.

3. The apparatus defined in claim 1, wherein said dome is made of a substantially transparent material and wherein ventilation openings are defined between said shroud and said dome for equalizing the temperature within and without said dome to thereby prevent fogging thereof, as when the sun shines thereupon.

4. The apparatus defined in claim 3, wherein said shroud defines a generally central opening in its top and has inwardly-extending mounting structure communicating with said opening for restingly supporting said dome, said dome having portions of its periphery spaced from said shroud to provide said ventilation openings.

5. The apparatus defined in claim 4, wherein said mounting structure includes raised rib means for spacing said dome periphery portions from said shroud.

6. The apparatus defined in claim 5, wherein said dome portion defines a slot extending inwardly from an edge of said dome portion to the periphery of the said opening formed therein.

7. The apparatus defined in claim 3, wherein said dome portion defines a slot extending inwardly from an edge of said dome portion to an edge of the said opening formed therein.

References Cited

UNITED STATES PATENTS

| | | | |
|---|---|---|---|
| 1,814,339 | 7/1931 | Sato | 47—29 |
| 2,641,078 | 6/1953 | Gearien | 43—5 |
| 2,746,194 | 5/1956 | Lonnman | 43—1 |
| 2,883,784 | 4/1959 | Obernolte | 43—4 |
| 3,134,188 | 5/1964 | Petersen | 43—17 |
| 3,213,561 | 10/1965 | Roemer | 43—17 |
| 3,226,881 | 1/1966 | Garrett | 47—30 |
| 3,230,655 | 1/1966 | Nomsen | 43—17 |

WARNER H. CAMP, Primary Examiner